United States Patent [19]

Petterson

[11] Patent Number: 4,712,814
[45] Date of Patent: Dec. 15, 1987

[54] COUPLING ARRANGEMENT

[76] Inventor: Tom Petterson, Box 19, S-452 05 Sydkoster, Sweden

[21] Appl. No.: 833,386
[22] PCT Filed: May 21, 1985
[86] PCT No.: PCT/SE85/00210
  § 371 Date: Jan. 17, 1986
  § 102(e) Date: Jan. 17, 1986
[87] PCT Pub. No.: WO85/05418
  PCT Pub. Date: Dec. 5, 1985

[30] Foreign Application Priority Data
May 21, 1984 [SE] Sweden ............................. 8402711

[51] Int. Cl.⁴ ............................................. F16L 37/26
[52] U.S. Cl. ..................................... 285/325; 403/353
[58] Field of Search ............... 285/325, 326, 327, 307; 403/353

[56] References Cited
U.S. PATENT DOCUMENTS

| | | | |
|---|---|---|---|
| 1,996,218 | 4/1935 | Swanson | 285/325 X |
| 2,396,747 | 3/1946 | Parrott | 403/353 |
| 4,258,940 | 3/1981 | Fudge | 285/307 X |
| 4,279,041 | 7/1981 | Buchholz | 403/353 X |
| 4,418,944 | 12/1983 | Haines | 285/325 X |

FOREIGN PATENT DOCUMENTS
37657 12/1886 Fed. Rep. of Germany ...... 403/353

Primary Examiner—Dave W. Arola

[57] ABSTRACT

Coupling arrangement consisting of two elements (1,10) capable of being connected one to the other, namely a first element (1/21) so arranged as to be introduced into and withdrawn from a second element (10) while adopting one or more specific positions in relation to the second element. This exhibits a body (12) in the form of a socket having an internal cavity and with slots (14) to permit the introduction of the first element. The first element exhibits a component (3) in the form of a disc having a peripheral surface (4), the dimensions of which match the dimensions of the cavity, and a shaft (2) which projects symmetrically from the disc-shaped component. The slots (14) of the second element come together at the front of the element, through which there extends a symmetry axis determined for that element. The slots exhibit dimensions such that the first element can be introduced through the slots with the disc-shaped component and the shaft running in a transverse sense to the symmetry axis of the second element, and can be turned into a secured position by causing the shaft to move in said slots and by bringing the disc-shaped component into a transverse position in relation to it.

3 Claims, 12 Drawing Figures

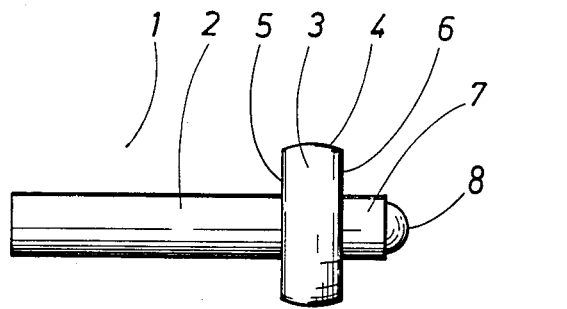
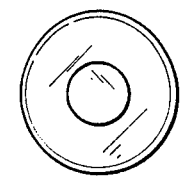
FIG. 1  FIG. 2
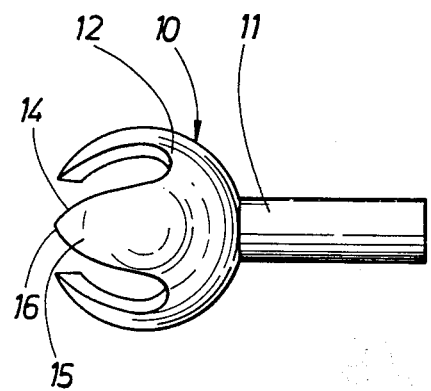
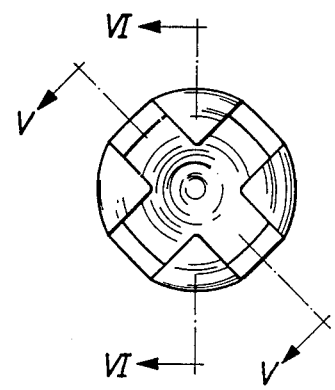
FIG. 3  FIG. 4

COUPLING ARRANGEMENT

TECHNICAL FIELD

The present arrangement relates to a coupling arrangement for the detachable coupling together of component parts. The components making up a coupling form part of pipework systems for gases and liquids or similar.

BACKGROUND

The need arises within a number of different areas to be able to connect different components together in such a way that they are held together, but in such a way that they can also be separated from one another once more. One type of coupling arrangement is designed for the transmission of forces such as tractive forces. Once coupling has taken place, it must permit certain movements to take place between the connected elements. An arrangement in accordance with the present invention is relevant, amongst other things, to the aforementioned type of coupling arrangement.

Coupling arrangements having this type of function have been disclosed previously, for example in U.S. Pat. No. 2,460,216, Dalton and U.S. Pat. No. 3,098,365, Pearson, both of which show one element with a pin and a second element with a sleeve into which the pin can be introduced in a certain position of rotation, whereupon it is locked by turning. A certain amount of angular displacement is permitted between the two elements in the locked position.

Other previously disclosed coupling arrangements exist, although these are not intended primarily for the transmission of forces in the connected state, but are intended instead to act as couplings in pipework systems for gases and liquids. It is possible, by means of such couplings, for pipe branches to be connected to connection points in the pipework system in such a way as to permit necessary equipment to be connected or the pipework system to be extended by means of hoses, for example. A number of different coupling arrangements of this kind have been disclosed and are used as a general rule either by being held together by means of a locking arrangement which can be released by means of a control device, or by turning the coupling components into the locked position, for which purpose they are provided with threads or bayonet fixings. In the case of certain couplings, in particular those intended for liquids, one or both of the parts of the coupling contain a self-sealing valve, which is opened only when the coupling is made, such that those pipe branches which can be connected together will remain closed so as to prevent leakage with the coupling arrangement in its disengaged state.

TECHNICAL PROBLEM

In the previously disclosed designs in accordance with the aforementioned Patent Specifications of power transmission couplings the specific surface load in the various relative positions between the elements is considerable even when the applied force is low, and these arrangements are not, therefore, suitable for high loadings and for frequent movements, since high wear will then occur.

Many disadvantages are associated with the previously disclosed fluid couplings referred to above. A serious disadvantage is that, if no self-closing valves are fitted, the component parts of the coupling will, if the pressure has not been interrupted before separating the coupling, be thrown away from one another, in which case personal injury may be caused, or at any rate an undesired escape of gas or liquids may occur at high pressures. Even if self-closing valves are fitted, the coupling components may still be thrown apart if the coupling is used at high gas pressures, because it is impossible to prevent a small quantity of gas from remaining trapped between the valves arranged in the two component parts of the coupling. Moreover, couplings with self-closing valves may be very difficult to connect together in the presence of pressure in the system, as it is also necessary in this case simultaneously to open the valves, which are under pressure. This is particularly noticeable in the case of grooved couplings which are pushed into engagement, although couplings which are screwed together can also be difficult to connect in the presence of pressure in the system.

SOLUTION

In the solution proposed in accordance with the invention both parts of the coupling are connected together in a position in which their axes adopt an angle in relation to one another, enabling the components parts of the coupling to be brought together. When the component parts of the coupling are directly in line with one another, surfaces on the component parts of the coupling will be locked together. This is achieved because a first part of the coupling can be introduced into a cavity in the second part of the coupling via slots arranged for this purpose, but only in the aforementioned angled position, whereas in the connected position external surfaces on the first part of the coupling will be locked into engagement with surfaces in said cavity in the second part of the coupling. The components are able to swing between the released position and the connected position because said surfaces constitute surfaces of rotation.

ADVANTAGES

The present invention proposes a coupling arrangement by means of which two elements can be connected together by a simple inserting and turning movement which requires little force, and can be separated just as easily with any associated loading being absorbed by relatively large surfaces. The arrangement can be used in a large number of applications. In the other application mentioned, such as a fluid coupling, one easily operated embodiment means that a coupling of this kind offers the advantage that separation of the coupling in the presence of pressure in the system will not result in the component parts being thrown apart, as is the case with previously disclosed couplings, since initial rotation is required from the coupling position to the release position. This provides an initial period during which the pressure can be interrupted and relieved, enabling separation of the elements to take place in the absence of pressure in the system.

DESCRIPTION OF THE DRAWINGS

Four embodiments of the invention are described below with reference to the accompanying drawings.

FIG. 1 shows a side view of a first element for the arrangement in a first embodiment;

FIG. 2 shows a front view of the element;

FIG. 3 shows a side view of a second element for the arrangement, which is common to the first two embodiments;

Figure 5:
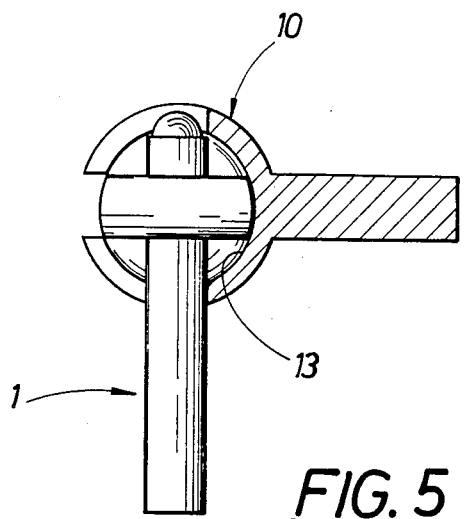
Figure 6:
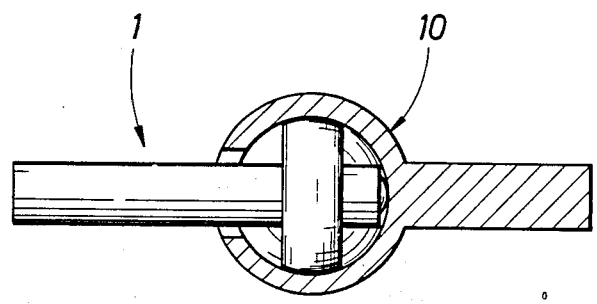
Figure 7:
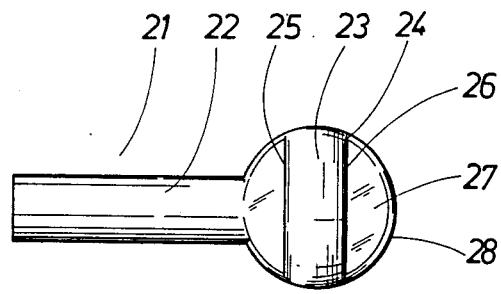
Figure 8:
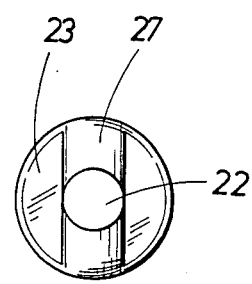
Figure 9:
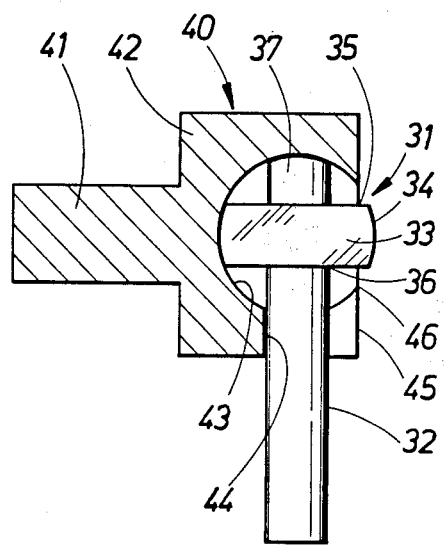
Figure 10:
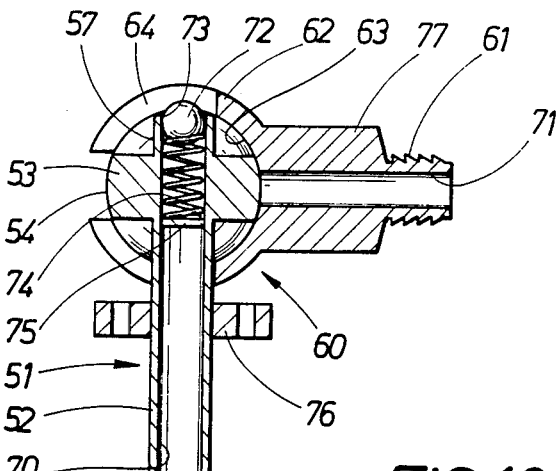
Figure 11:
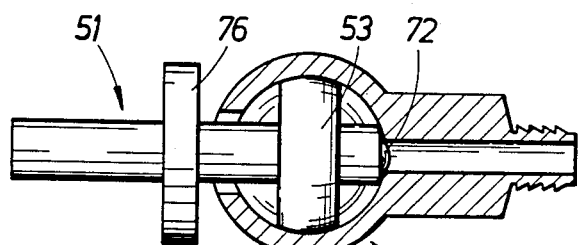
Figure 12:
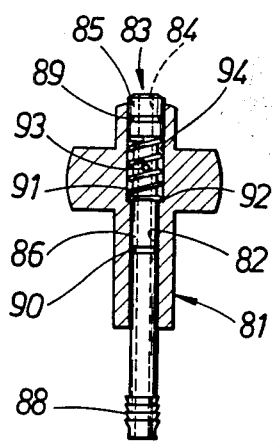

a front view of the element is shown in FIG. 4;

FIG. 5 shows a section of the two elements connected together in a first position;

FIG. 6 shows a section of the two elements in a second position;

FIG. 7 shows a side view of the first element in its second embodiment;

FIG. 8 shows a front view of the element;

FIG. 9 shows the third embodiment as a partially sectioned side view;

FIGS. 10 and 11 show the fourth embodiment in positions which correspond to the positions shown respectively in FIGS. 5 and 6; finally, FIG. 12 shows a variant of a component part of the embodiment in FIGS. 10 and 11.

PREFERRED EMBODIMENTS

Three embodiments of a coupling arrangement intended primarily to transmit tractive and compressive forces are first described below. As will subsequently be demonstrated by the fourth illustative embodiment, this type of coupling is relatively easily modified for other purposes, in conjunction with which a fluid coupling is described.

The first element for the arrangement, identified by the reference designation 1, comprises a shaft 2, a disc 3, the external surface 4 of which constitutes a central ring of a sphere, which is bounded by an outer axial surfaces 5 and an inner axial surface 6. The shaft extends from the outer axial surface 5. From the inner axial surface 6 there extends a projection 7 terminated by a dome 8 which, in the illustrative embodiment, consists of a steel ball, possibly spring-loaded, partly pressed into the projection 7.

The second element 10 of the arrangement also exhibits a shaft 11 and, attached to one of its ends, a body 12 in the form of a socket. The body 12 exhibits an inner cavity 13 (see also FIG. 5) which is spherical and which in this case exhibits a diameter which is slightly larger than the diameter of the spherical surface 4 of the first element 1. The spherical cavity 13 is open towards that end of the body 12 which is on the opposite side from the shaft 11 via at least two slots; four slots 14 are shown in this case, which extend as far as the median plane of the spherical form of the cavity 13, which has the same axis as the shaft 11. The full width of the slot must extend as far as this plane, and since the slots terminate with rounded bottoms, these must extend beyond the plane. The slots 14 are thus adjacent to one another at the outer end of the body 12 in such a way that the wing-like sections 15 extending between the four slots are terminated by points 16. The outer surface of the body 12 is of no significance to the coupling function of the arrangement. In the Figures the body 12 is shown to exhibit a spherical external form which encloses the cavity 13 with a reasonable thickness of material.

The external form may, however, be executed other than as a sphere, depending on the field of application and the requirement for resistance to deformation. In this particular embodiment all four slots have been shown as being cut through the material. All that is necessary, however, is a single transcurrent slot at a point at which the shaft 2 is to be introduced, on condition that it is always possible to select the same position for the introduction of the shaft. The other slots 14 can exhibit outward-facing bottoms which extend in line with the external diameter of the cavity 13, so that the disc 3 can be introduced from outside and into these slots with the shaft 2 situated in the aforementioned, fully open and interjacent slots. A very solid embodiment is achieved in this way, which is capable of withstanding high tractive forces. The outer surface of the component 10 may, for example, be cylindrical instead of spherical for this purpose.

The second embodiment of the first element may be appreciated from FIGS. 7 and 8. The same reference designations applied to the corresponding parts in the first embodiment have been used in these Figures, but in the series from 21 onwards. Thus, the first element as a whole is identified by 21, the shaft by 22, the disc by 23, and its outer periphery by 24 and its sides by 25 and 26. The element additionally contains a disc 27 with an outer spherical periphery 28 arranged transversely to the disc 23. The element, apart from its shaft 22, can thus also be regarded as a sphere having four slots cut at right-angles to one another, the walls of which form the surfaces 25 and 26 and corresponding sides of the disc 27. In accordance with one variant, the outer part of the disc 27 outside the axial surface 26 could be replaced by a pin corresponding to the pin 7 in FIG. 1.

In the case of the embodiment illustrated in FIG. 9, the reference designations used are higher by a further ten units to the extent that they relate to corresponding parts. In this case, too, there is a first element 31 with a shaft 32 and a disc 33. The disc has an outer periphery 34, which does not, however, constitute part of a sphere as in previous embodiments, but instead constitutes part of a cylinder, more precisely a central section cut from a cylinder and bounded by two circular surfaces 35 and 36. In this case, too, there may be a projection 37 on the opposite side to the shaft 32. The second element, indicated here by 40, exhibits a shaft 41 and a head 42 having a cylindrical cavity 43. Because the cavity 43 is intersected by the end surface 45 of the head 42, an opening 46 is produced. Extending from the end surfaces 45 is a slot 44, which may be single-sided as shown in the Figure, or transcurrent. The slot 44 has a width such as to permit the shaft 32 of the first element 31 to be introduced into it.

The embodiment illustrated in FIGS. 10 and 11 corresponds for the most part to the first embodiment illustrated in FIGS. 1-6. It is shown in two positions, which correspond to the positions in FIGS. 5 and 6. The coupling arrangement in accordance with the fourth illustrative embodiment is intended to serve as a fluid coupling. As in the case of the first embodiment, it consists of a first element 51 (the reference designations used in FIGS. 1-6 are used here in the series from 51 onwards) and a second element 60. The first element exhibits, as before, a shaft 52 and a disc 53 with a spherical or cylindrical outer surface 54 and a projection 57. The second element also exhibits a shaft 61 and a second part 62 with an internal cavity 63, which matches the surface 54 of the first element 51. The cavity 62 opens through slots 64. The novel features of the present embodiment are that the first element 51 is pierced by a hole 70 (the association with the previous reference designations ceases here), and that the shaft of the second element 60 is also pierced by a hole 71. The hole 70 opens into the projection 57, and the hole 71 opens into the cavity 63. It is possible to install self-opening valves in the mouths of the holes. As an example of this, the hole 70 is shown to contain a ball 72, which is held against a seating 73 by the action of a spring 74, which in turn is supported by a washer 75 pressed into the hole 70, said washer being in the form of a cross so that fluid can pass through the hole 70, past the washer 75 and out through the mouth past the ball 72, on condition that this has been forced backwards and off the seating 73. In FIG. 10 it is shown in the closed position resting against the seating 73, but it is shown in the open position in FIG. 11. A similar valve can be inserted into the hole 71, but is not shown in this illustrative embodiment.

The shafts 52 and 61 are so executed at their ends as to permit the connection of pipework systems; grooving intended to retain a hose is illustrated here, although threaded nipples, for example, for pipes may be provided as an alternative. The element 51 in this illustrative embodiment is intended to be permanently installed, and the shaft 52 is provided for that purpose with a flange 76. The shaft 61 is provided with a gripping section 77.

Illustrated in FIG. 12 is a variant of the element 51, identified here by the reference designation 81. Here, too, there is a transcurrent hole identified by the reference designation 82. Into this there is inserted a valve 83, through which there extends a hole 84. The valve has a head 85, a narrower intermediate part 86 and a connecting part 88 for connection to a pipework system. The head 85 is provided with a sealing ring 89 to produce a seal with the bore 82, and the intermediate part 86 is provided with a sealing ring 90 to produce a seal with a narrower central part of the bore 82. A spring 91 resting against the head 85 and against a shoulder 92 inside the bore 82 attempts to push the slide 83 outwards from the projection 57. The intermediate part 86 exhibits a transverse bore 93, which connects the bore 84 in the slide with a chamber 94 formed in the bore 82 inside the head 85. The head 85 is so arranged as to fit inside the mouth of the bore 71 for the corresponding element 60, which can be of the same design as that illustrated in FIGS. 10 and 11.

There now follows a description of the function of the first three embodiments, which are used for power transmission couplings, for example for the connection together of machine elements and of towing links, and for suspensions, etc.

Because the slots 14 are arranged in pairs directly in line with one another and exhibit the same width as the disc 3 between its axial surfaces 5 and 6, the element 1 can be introduced into two of the slots until the midpoint of its spherical surface 4 is directly in line with the mid-point of the spherical cavity 13 in the element 10; see FIG. 5. If the element 1 is now rotated from that position so that the shaft 2 adopts a more central position than the perpendicular position to the shaft 11 of the element 10 illustrated in FIG. 5, the spherical surface 4 of the element will be locked in engagement with the spherical surface of the cavity 13, which curves inwards towards the centre in a direction away from the shaft 11. The inward-curving surfaces will thus lock the element 1 in position, preventing it from being withdrawn. If the elements are positioned fully in line with one another, as shown in FIG. 6, the contact surfaces will be as large as possible, actually being one half of the spherical surface 4 minus the space occupied by the slots 14, which is applicable when the elements are separated. When the elements are pushed into engagement with one another, a slightly larger surface area will be achieved due to the fact that the slots 14 taper in that direction, at the same time as which the ball 8 can be so arranged as to constitute a supplementary support. As the elements are rotated in relation to one another from the position in which they are directly in line, the contact surfaces will be reduced with regard to separation of the elements until the angle between them is sufficiently great to permit the disc 3 to be withdrawn via one of the pairs of slots. By curving in this direction the tips of the parts 15 will guide the shaft 2 of the element 1 so that it will engage in one of the slots. The elements can be separated easily without the need for accurate movements only by positioning the elements at a right-angle to one another.

The embodiment in accordance with FIGS. 7 and 8 functions in essentially the same manner. When assembling the coupling, however, it is necessary to ensure not only that the disc 23 is inserted into two opposing slots 14, as in the case of the first embodiment, but also that the disc 27 is inserted into the other pair of slots 14 (four slots are required in this embodiment). Once the elements have been rotated in relation to one another from the connection position and the separation position, the elements will remain locked together at all times, including in the first embodiment. In the second embodiment, however, the elements can also be locked in engagement with one another in said position in accordance with FIG. 5 by causing the shaft 22 to rotate so that the disc 27 is no longer in line with any pair of slots. In the first embodiment, on the other hand, rotation of the shaft will not produce the coupling function, since the element is rotationally symmetrical. In the second embodiment, therefore, it is possible to utilize the entire angle of pivoting of the elements, that is to say 180°, without any risk of undesired separation arising in the extreme positions as a result.

The arrangement is accordingly very easy to connect together and to separate. It provides relatively large contact surfaces under load, and it provides the possibility for the universal pivoting of the two elements in relation to one another, that is to say angular deflection in all directions. The element 1 is free to rotate at all times inside the element 10. As an alternative, if it is wished for driving to take place during rotation, the element 1 can be provided with pins or similar which act as drivers projecting into the slots 14.

The two elements can be executed in such a way as to require a certain amount of springing in order to permit the element 1 to be introduced into the element 10, in this way producing a snapping function during connection and separation, whereas complete connection is achieved in the locked position.

The embodiment in accordance with FIG. 9, when it is used, exhibits very great similarities with what is applicable to the first two embodiments. The two elements 31 and 40 can thus be connected together if the element 31 is introduced through the opening 46 into the position shown in FIG. 9. If the shaft 32 is then rotated upwards in line with the shaft 41 the disc 33 will rest against the cylindrical surface of the cavity 43, when it will be incapable of being withdrawn and will be held in such a way that the surface of the cavity 43 and the surface 34 are concentric. The elements will remain connected together even if the shafts 32, 41 are deflected through an angle in relation to one another, provided that the surface 34 does not reach the opening 46. Deflection in two planes, as in the first two illustrative embodiments, is not possible in this case because the interacting surfaces are cylindrical.

One interesting application for the element is for securing doors and hatches, for example. If an openable element of this kind is fitted with two or more pairs of the arrangement, installed on two opposing edges of the openable element, then the element will be held in a closed position by the aforementioned snapping effect on both sides. As soon as one of the sides is swung outwards by snapping apart the arrangements along one edge, the arrangements on the other edge will be locked together and will form coherent hinges during the swinging motion. If the other side is opened instead, then it is here that snapping apart will take place, and the arrangements on the other side will act as hinges. If the element of the second embodiment (FIGS. 7, 8) is used, then not only will holding together through a snapping function be achieved, but also actual locking together, if the first element 21 is so arranged as to be capable of pivoting about the axis of the shaft 22. As has already been mentioned, the two elements will then be locked together in all angular positions. This feature may also be utilized in order to permit a hinge to be installed and subsequently locked.

The function of the coupling arrangement as a fluid coupling will now be described. This is based on the assumption, with reference to FIG. 10, that the element 51 is permanently installed, for example on a panel, by means of the flange 76. The fluid, which may be compressed air for example, is supplied through the hole 70, and for as long as the ball 72 is not depressed, the outlet will be closed.

The element 60 is assumed to be supported by a hose, by means of which it is proposed to connect an item of equipment to the outlet represented by the element 51. This takes place, as previously described, by causing the elements 51 and 60 to be deflected through an angle in relation to one another and to be brought together in the manner illustrated in FIG. 10. If the free element 60 is now turned up into the position illustrated in FIG. 11, the two elements will be connected together mechanically as previously described. When the ball 72, as it moves, comes up against the wall of the cavity 63, it will be forced inwards against the effect of the spring 74, and the outlet, for example for the compressed air, will be opened. It will be unable to flow out, however, for as long as the projection 57 in contact with the surface of the cavity 63 continues to sweep over said surface and until the ball 72 reaches the mouth of the hole 71. In this position a connection will have been established between the holes 70 and 71. The mouth of the hole 71 is best provided with a soft gasket, for instance some previously disclosed kind of collar seal.

If, instead of the element 51, an element of the type identified by the reference designation 81 in FIG. 12 is used, then it must be assumed that the element is connected to the compressed air line via a shut-off valve. For as long as the valve remains closed there will be no pressure in the bores 82 and 84 of the element, and it will be possible to pull the head 85 over the end of the element by pulling on the outer end of the slide. In this position it is possible for the element to be inserted into the element 60, as previously described. Once the elements have been moved into their relative coupling positions in accordance with FIG. 11, the valve is opened. The bore 84 will be pressurized in this way, and the compressed fluid will flow out through the transverse bore 93 and into the chamber 94, thereby causing the head 85 to be forced outwards in the manner of a piston and locked in the mouth of the bore 71 which is shaped so as to accommodate the head. In this way the two elements are locked in the coupling position in relation to one another, and it will not be possible to turn them into the released position until the valve has been closed and the head 85 can be pulled once more into its inner position.

In the case of a first described variant, a fluid coupling is achieved which is very easy to connect together even if it is provided with self-closing valves. The valve is not opened by the application of any direct pressure, but by being pushed inwards during a turning motion. The free pipe branch can be used as a lever in order to produce the movement. The elements will not be thrown apart one from the other as the coupling is opened, and the pressure will first be relieved whilst the elements are being turned into the release position, so that no ejection effect will occur.

In the case of the variant in accordance with FIG. 12, a complete guarantee is provided that the outlet from the pressurized system will shut off before any disconnection takes place. In this case it is not necessary to rely on self-closing valves to provide the closing function. Such valves may, in view of the fact that they require to be manufactured with small dimensions, be prone to faults resuting in leakage.

The arrangement is capable of modification in many ways, especially in the more complicated form such as the fluid coupling. Those variants which are described as power transmission couplings can thus be executed as fluid couplings, which is equally true of the third type of embodiment having a cylindrical instead of a spherical connecting surface.

The surface along which the first element slides with its pipe orifice over the second element and as far as its pipe orifice can be executed in such a way as to produce a full sweep of the surfaces only in the connection position with the two elements in line with one another. It is possible in this way to achieve the slow rlease of the pressure as the couplng is opened. If the coupling is provided with a self-closing valve, then as it is being turned to the coupling position and to the release position it will gradually be opened and closed by the successive pushing-in/release as it moves along the surface which deviates from the spherical or cylindrical form. A design of this kind is particularly suitable for very high pressures, since the pushing-in of the self-opening valve calls for less actuating force because of the wedge effect which occurs at the same time as the pressure is relieved progressively.

In the case of fluid couplings having one fixed and one loose component, it is possible for the first or the second element to be used in their respective positions as an alternative. A design in accordance with the third embodiment in which the hollow second element is fixed may be advantageous in that case. The possibility of swinging is provided in this design only in a plane in which the coupling movement and the actuating movement are effected. It is appropriate to restrict the swinging to a single plane in this way in those cases in which a row of connection points are to be provided, when swinging in a sideways sense also would encroach upon the adjacent coupling points. An advantageous design thus involves executing the elements of the coupling arangement in the form of modules capable of being installed in a row of the desired length.

The aforementioned restriction of the swinging to a single plane only can also be achieved, for example, in the second embodiment of the disc, the centre plane of which is situated on the axial line of the shaft, is executed with a diameter greater than that of the other disc. At the same time the second element is provided with a slot for the larger disc. In this way a rotating fixing is produced in one plane, whilst the locking function is maintained, as before, by the smaller disc once the two component parts of the coupling have been turned into line with one another. The expression "in line with one another" need not necessarily be understood to denote that any of the shafts are in line with the others. In certain applications it is not necessary for any shaft to be present apart from the section of shaft which is capable of being introduced into the slot, but for flanges, for example, to be provided instead, it being permissible for such shafts or flanges to be angled relative to the symmetry plane in relation to which the coupling and connecting positions are determined.

I claim:

1. Coupling means comprising a first element having a main portion in the form of at least one disc having an outer spherical surface forming a surface of rotation and sides connected by means of said spherical surface, a shaft extending from one of said sides, and a second element having a cavity with an inner surface forming more than one-half of a spherical surface of rotation, said cavity having a diameter slightly larger than said surface of rotation of said first element, said cavity having an opening to allow the main portion of the first element to be inserted therethrough into the cavity, said opening being in the form of a first slot, said first slot being sized to correspond to the width of the main portion of the first element measured parallel to the axis of the shaft, and a second slot being sized to correspond to the width of the shaft so that the main portion of the first element can be introduced into the cavity by inserting it through the first slot with the shaft introduced into said second slot until the center of the spherical surface of the first element coincides with the center of the spherical surface in the cavity of the second element, whereby the first and second elements can be locked to each other by turning the main portion of the first element in the cavity as the shaft moves in the second slot so that the outer spherical surface is substantially out of alignment with said first and second slots.

2. Coupling means according to claim 1, in which the sides of said disc are substantially flat, said shaft extending from the center of said one side in a direction of a radius of the outer spherical surface.

3. Coupling means according to claim 1, in which the main portion of the first element has the form of a sphere having four slots defined therein at right angles to each other with the walls of the sphere adjacent to the slots defining said one disc with the sides thereof being substantially flat and a second disc crossing said one disc at right angles thereto, said shaft extending from the center of said one disc one side in a direction of a radius of the outer spherical surface, and extending from said one side of said one disc, said second disc extending with its sides in the same direction as the shaft.

* * * * *